(12) United States Patent
Prasad et al.

(10) Patent No.: US 8,526,723 B2
(45) Date of Patent: Sep. 3, 2013

(54) SYSTEM AND METHOD FOR THE DETECTION OF ANOMALIES IN AN IMAGE

(71) Applicant: Los Alamos National Security, LLC, Los Alamos, NM (US)

(72) Inventors: Lakshman Prasad, Los Alamos, NM (US); Sriram Swaminarayan, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 13/660,672

(22) Filed: Oct. 25, 2012

(65) Prior Publication Data

US 2013/0156305 A1 Jun. 20, 2013

Related U.S. Application Data

(63) Continuation-in-part of application No. 12/822,059, filed on Jun. 23, 2010, now Pat. No. 8,428,354.

(60) Provisional application No. 61/219,588, filed on Jun. 23, 2009.

(51) Int. Cl.
*G06K 9/00* (2006.01)

(52) U.S. Cl.
USPC ........................................... 382/164

(58) Field of Classification Search
USPC ................. 382/173, 162–165, 190, 199, 204, 382/224–226, 282–284, 274–275
See application file for complete search history.

(56) References Cited

U.S. PATENT DOCUMENTS

| | | | | |
|---|---|---|---|---|
| 7,127,104 B2 * | 10/2006 | Prasad et al. | .................. | 382/164 |
| 7,349,922 B2 * | 3/2008 | Brandt et al. | ......................... | 1/1 |
| 7,724,256 B2 * | 5/2010 | Grady et al. | .................. | 345/440 |
| 7,822,274 B2 * | 10/2010 | Sinop et al. | .................. | 382/173 |
| 7,929,755 B1 * | 4/2011 | Skirko | .......................... | 382/164 |
| 7,978,913 B2 * | 7/2011 | Knee et al. | .................... | 382/173 |
| 8,086,037 B2 * | 12/2011 | Yang | ............................. | 382/173 |
| 8,194,974 B1 * | 6/2012 | Skirko | .......................... | 382/162 |
| 8,224,089 B2 * | 7/2012 | Nielsen | ........................ | 382/173 |
| 8,335,374 B2 * | 12/2012 | Boardman | .................... | 382/165 |

* cited by examiner

*Primary Examiner* — Ishrat I Sherali
(74) *Attorney, Agent, or Firm* — Ryan B. Kennedy

(57) ABSTRACT

Preferred aspects of the present invention can include receiving a digital image at a processor; segmenting the digital image into a hierarchy of feature layers comprising one or more fine-scale features defining a foreground object embedded in one or more coarser-scale features defining a background to the one or more fine-scale features in the segmentation hierarchy; detecting a first fine-scale foreground feature as an anomaly with respect to a first background feature within which it is embedded; and constructing an anomalous feature layer by synthesizing spatially contiguous anomalous fine-scale features. Additional preferred aspects of the present invention can include detecting non-pervasive changes between sets of images in response at least in part to one or more difference images between the sets of images.

17 Claims, 15 Drawing Sheets

Fig. 3a Skate

Fig. 3b Flounder

Fig. 3c Hake

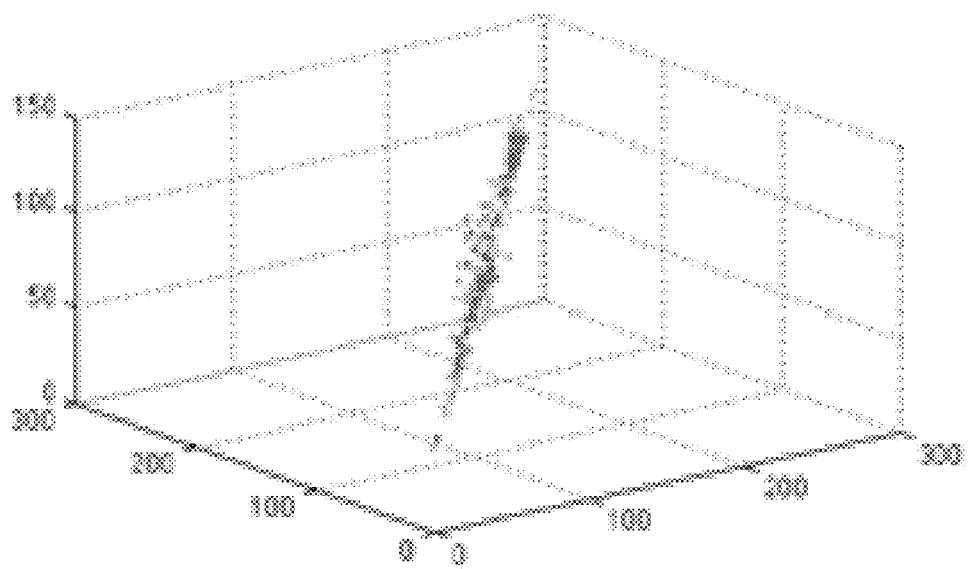
FIGURE 10D1
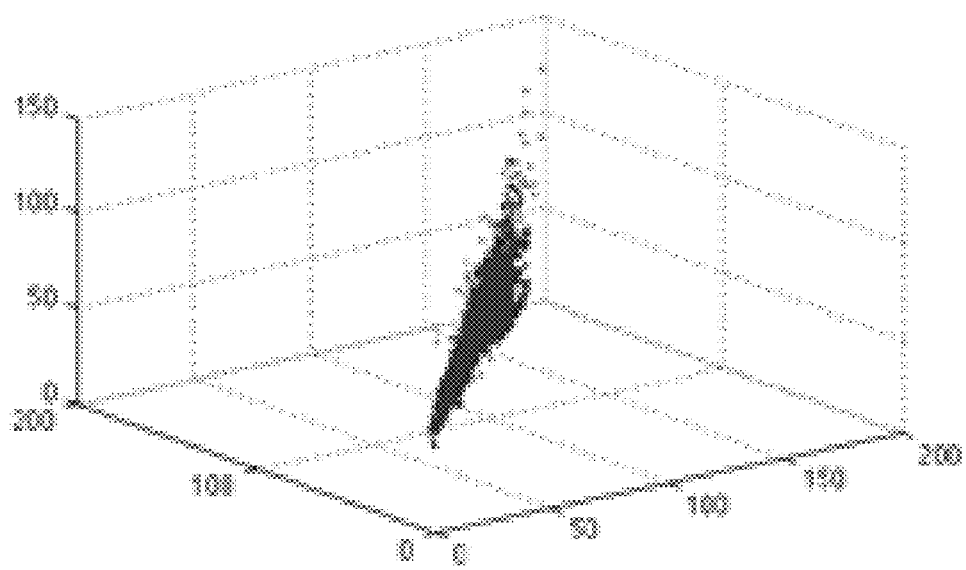
FIGURE 10D2

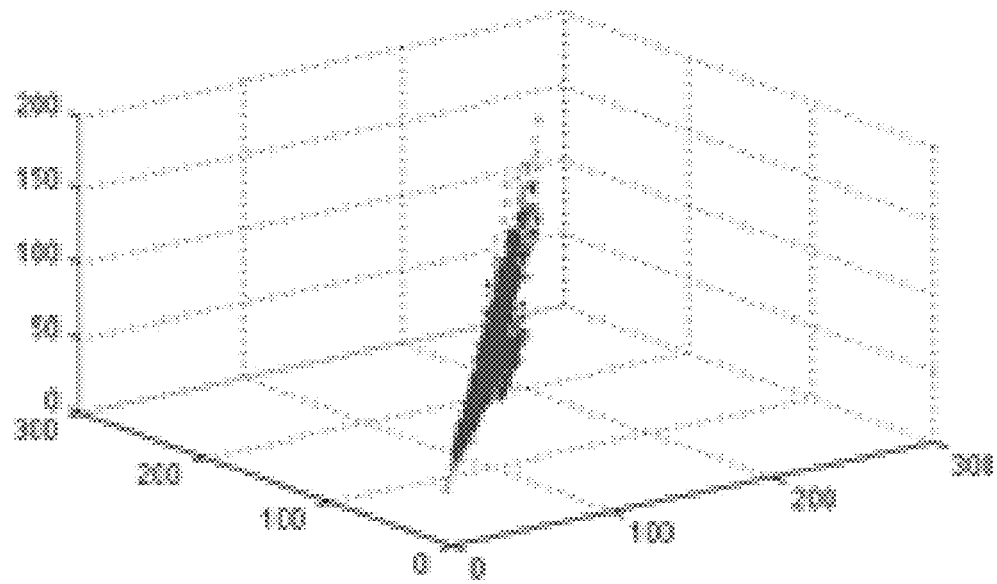
FIGURE 10D3
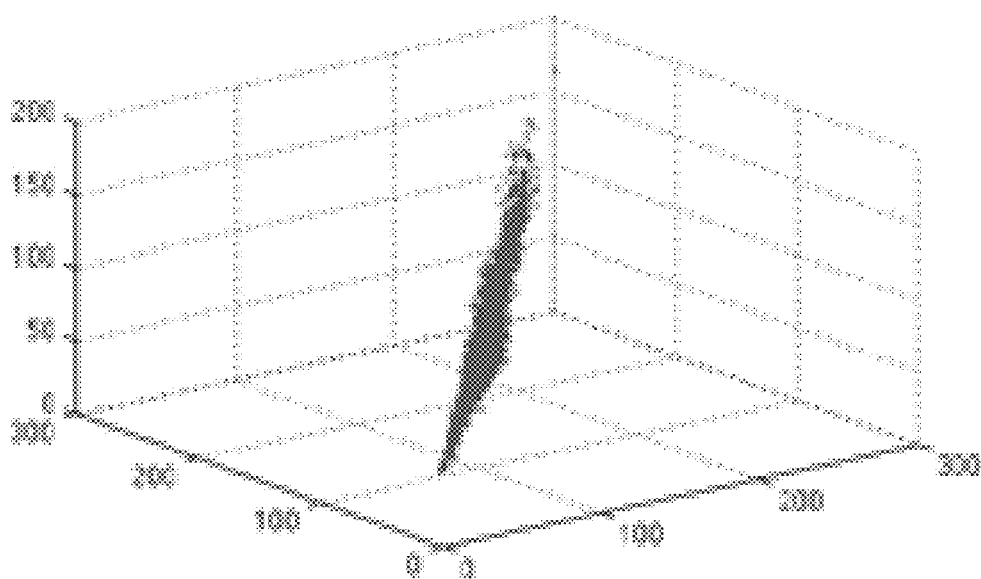
FIGURE 10D4

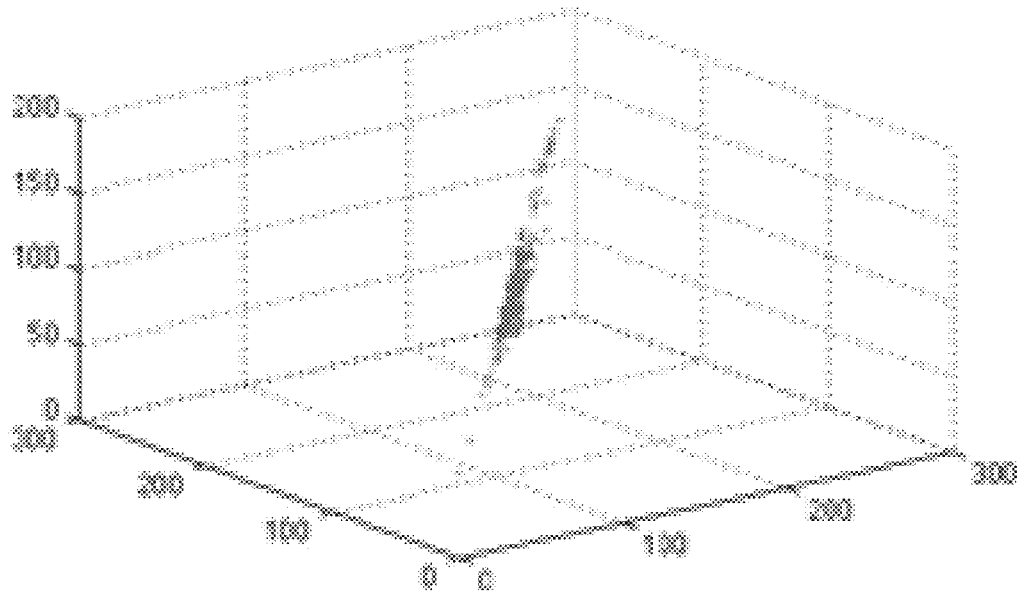
FIGURE 10D5

SYSTEM AND METHOD FOR THE DETECTION OF ANOMALIES IN AN IMAGE

This application is a continuation-in-part of U.S. patent application Ser. No. 12/822,059, filed on Jun. 23, 2010 and entitled "Image Segmentation by Hierarchical Agglomeration of Polygons Using Ecological Statistics," which claims the benefit of U.S. Provisional Patent Application Ser. No. 61/219,588, filed Jun. 23, 2009 and having the same title, the contents of each of which are incorporated by reference herein in their entirety.

STATEMENT REGARDING FEDERAL RIGHTS

This invention was made with government support under Contract No. DE-AC52-06NA25396, awarded by the U.S. Department of Energy to Los Alamos National Security, LLC for the operation of the Los Alamos National Laboratory. The government has certain rights in the invention.

BACKGROUND

Image segmentation is the first and perhaps the most critical image processing step to automating image understanding by computers. Segmentation consists of decomposing an image into its constituent salient features and objects that define the semantic content of the image. Image segmentation sets the stage for object detection and recognition by providing a high-level representation of an image in terms of regions of uniform color/intensity and geometric regularity.

Objects in images are typically contiguous subsets of such regions. Thus, image segmentation transforms an image from a low-level pixel-based representation to an intermediate-level region-based representation that enables the piecing together of the 'jigsaw puzzle' of regions into individual objects of the image. Image segmentation can be thought of as representing the method of perception in human vision. This representation does not assume a priori knowledge of the objects in an image; rather it uses local regularities and structure in an image to parse the image into distinct parts.

There has been no universally applicable method to date that can segment all images equally well. Although there are several segmentation methods developed over the decades, almost all can be classified, broadly speaking, into one of two categories: 1) methods that seek structure by decomposing an image into regions of uniform color or intensity, generally assuming that, to a large extent, parts of an object are dominated by one color; 2) methods that seek structure by identifying parts of an image that exhibit rapid change in color/intensity, generally assuming that boundaries of objects are sites of such rapid change in intensity.

Digital images are made up of pixels of subtly varying intensities that are dithered in such a way as to produce the effects of shade and gradation of color. Since methods of the first kind rely on binning pixels into fewer classes, this in general results in speckle noise due to neighboring pixel differences being enhanced. It also has the effect of marring edges that have more gradual variation in intensity across them, or creating false edges due to gradual variation in intensity across a region. While methods of the second kind do produce edges that belong to object boundaries, these edges are typically fragmented and as such do not bear any relationship to one another. Thus, additional work is required to group and interrelate edges belonging to the same object.

Additionally, previous work by others in image segmentation has mostly centered on grouping pixels into regions based on spectral and textural similarity. The difficulty in estimating locally adaptive thresholds and neighboring sizes for evaluating this criteria, coupled with the need to evaluate at each pixel, often results in erroneous decompositions and high processing times. Many application-driven approaches, such as industrial vision for quality control and nondestructive analysis limit the scope of segmentation to a specific class of spectrally or structurally distinctive objects imaged in controlled lighting and background settings and achieve satisfactory results. However, these approaches are too restrictive to be of interest to the larger scientific goals of computer vision or to the wider applicability of its methods. Other methods, while not restricting the types of images or features require specification of the number of regions or parameters. Typically, the choice of these inputs is at best ad hoc as it is not clear a priori what is best for segmenting a particular image.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE PRESENT INVENTION

In general, there is no single segmentation of an image that captures all possible features of interest since they occur at multiple scales and varying spectral prominence that determine their saliencies. Further, what is of interest in an image is quite often determined by what is sought in an image. Many application-driven approaches segment a specific class of spectrally or structurally distinctive objects and achieve satisfactory results via supervised or unsupervised methods. Other methods, while not restricting the types of features sought, require specification of the number of objects of interest, regions, or the specification of tolerances and parameters. Typically, the choice of these inputs is ad hoc as it is not clear a priori what is best for segmenting a particular image. It is desirable to have a segmentation scheme that reveals all potentially salient objects at different scales in a hierarchical manner so that general queries about image content can be addressed without a priori knowledge about the image. Furthermore it is desirable to have the content information available in a context-friendly manner so that parts of objects that are salient by themselves can be related to the objects they belong to or interact with at different scales in the hierarchy.

Embodiments of the present invention provide an approach to hierarchical image segmentation using an initial, fine-scale seed segmentation that faithfully conforms to image contours, such as the vectorized image segmentation via trixel agglomeration method described in U.S. Pat. No. 7,127,104 (hereinafter referred to as VISTA). The polygons from this initial segmentation are then iteratively grouped based on their size distributions and spectral proximities to yield a hierarchy of image segmentations wherein each polygon at each level is an aggregate of one or more polygons at the previous finer, level. Both object and texture regions are segmented in this method, with the successively coarser polygons inheriting tfidelity to image edges of the initial segmentation. This approach yields a rapid hierarchical segmentation and is capable of addressing very large, complex images such as aerial and satellite images.

BRIEF DESCRIPTION OF THE DRAWINGS

FIGS. 10A, 10B, 10C, and 10D exemplary images and data generated by one example implementation of the preferred method for detecting anomalies in accordance with the present invention.

DETAILED DESCRIPTION OF THE PREFERRED EMBODIMENTS

Figure 1:
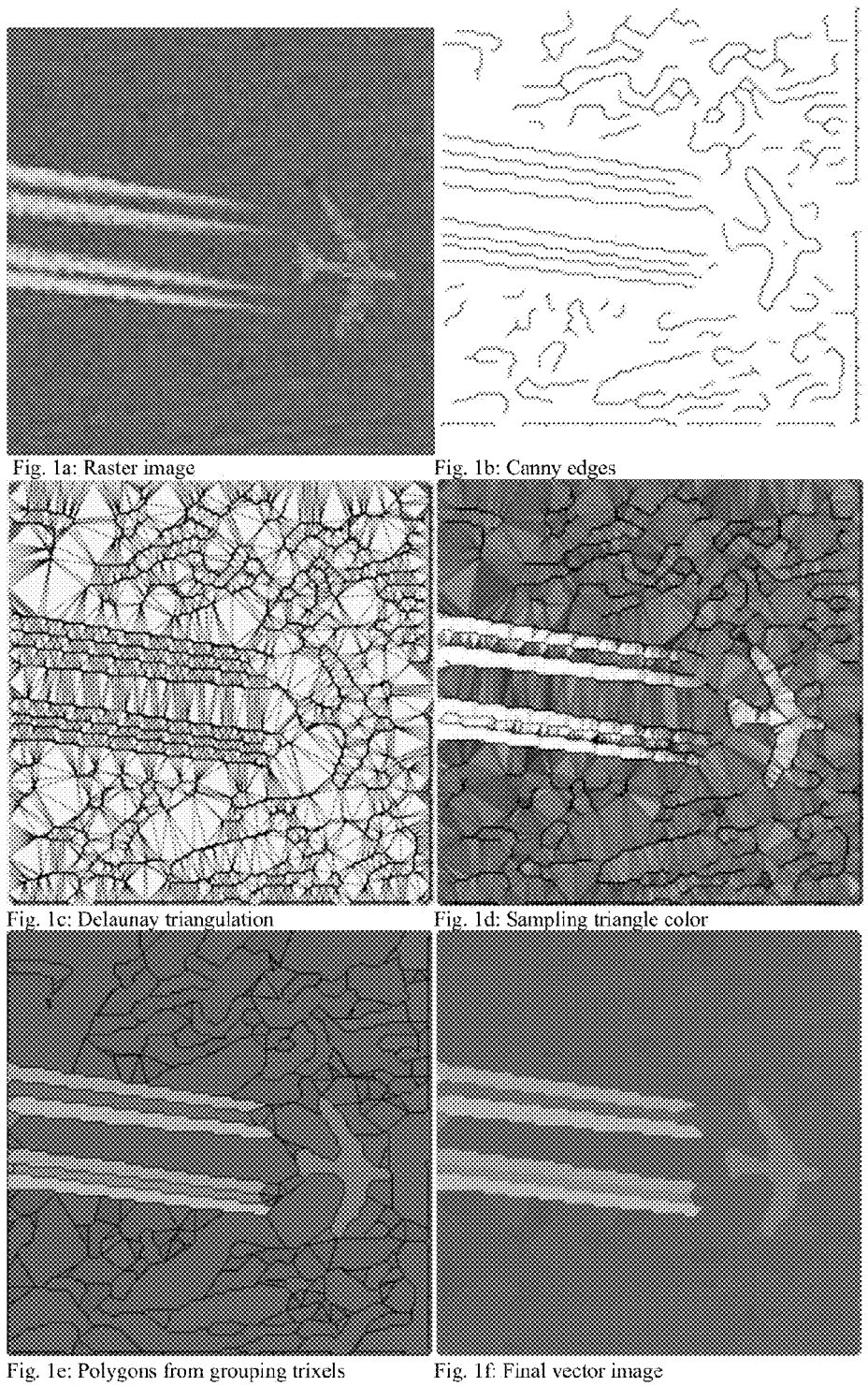
FIGS. 1a through 1f show example acts of the patented vectorized image segmentation algorithm VISTA.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other. Referring to the figures in general, it will be understood that the figures are for the purpose of describing a particular embodiment of the invention and are not intended to limit the invention thereto.

Image Segmentation

Given an image comprised of pixels as input, a fine-scale seed segmentation of the image into polygons can be obtained. Described here is a particular embodiment of the present invention that uses VISTA (U.S. Pat. No. 7,127,104) to obtain this initial segmentation. However, the preferred embodiments of the present invention apply equally well to alternate initial seed segmentations that 1) provide a polygonal decomposition of the input raster image including pixels, 2) provide information about polygon color, adjacency, and the sequence of edge points shared between any two adjacent polygons. In the next three paragraphs the VISTA algorithm is briefly reviewed.

VISTA can preferably be used to obtain an initial edge-based seed segmentation, which represents a departure from the common approach of grouping pixels for segmenting images and, instead, obtains polygonal segmentations by perceptual grouping of image edge-adaptive triangular mesh elements. One aspect of the VISTA process is shown in FIGS. 1a-1f. As shown in FIG. 1b, the first step is to obtain image edges by a Canny edge detection procedure. Next, a constrained Delaunay triangulation of the edge point set is performed so that no triangle edge intersects an edge between neighboring edge pixels as shown in FIG. 1c. The proximity graph property of Delaunay triangulations is used to establish regional correspondences between contour chains and provide candidate edge completions of the Canny contours, which are typically fragmented and open curves. The pixels in each triangle are sparsely sampled to estimate an average color to be attributed to the triangle as shown in FIG. 1d. These color-attributed triangles (trixels) are the new image primitives that will be grouped to yield polygonal image segments.

A grouping graph G is preferably constructed, with nodes representing trixels and links representing the adjacency of trixels. Cuts in G are introduced by identifying those edges between trixels that support desirable contour completions and deleting corresponding links in G. The evaluation of a trixel edge for contour completion is based on six elementary perceptual criteria (see Table 1 below), modeled as Boolean filters on the trixel edges and is a logical concatenation of these criteria.

TABLE 1

Boolean perceptual edge filters and their properties

| Filter | Property |
|---|---|
| TooLong | length > Median Delaunay edge length |
| Shortest | Shortest edge of either flanking trixel |
| Canny | Connects neighboring Canny edge points |
| EndLink1 | Connects (with minimum turn) end point of a contour to the interior of another contour (transversality) |
| EndLink2 | Connects two contour endpoints |
| Junction | At least one flanking trixel has all its vertices on different contours |

The cut criterion C is then given by:

$$C=(\sim TooLong) \wedge [Canny \vee EndLink1 \vee EndLink2 \vee (Junction \wedge Shortest)]$$

This criterion has been experimentally found to yield optimal results in terms of both image fidelity and polygon economy. A link l in G is cut if and only if C is equal to 1 for the corresponding edge between two trixels whose representative nodes in G are linked by l. Trixels in connected components of the resulting cut graph are grouped to obtain polygonal image segments, with each segment attributed the area-weighted average color of all constituent trixels as shown in FIG. 1e. The high efficiency of the initial segmentation (which can be prohibitively expensive with a method such as normalized cuts approach for segmenting large images) and the fact that the resulting polygons conform to image contours, are preferred reasons for employing VISTA as the starting point for a hierarchical segmentation scheme based on region growing. The fine-scale segments conforming to image contours, obtained by VISTA, assures edge integrity of coarser regions when successively merging polygons, unlike pixel-based region growing methods.

The following paragraphs describe one preferred embodiment of the present invention that includes a general algorithmic procedure to successively merge the fine-scale polygons obtained as initial seed segmentation into larger polygons representing visually salient features in an image. This results in a hierarchy of polygonal image segmentations of the input pixel image. The polygon agglomeration process ensures that each polygon in the initial or any intermediate level of segmentation in the hierarchy is fully contained in a polygon at the next, coarser level of segmentation. This containment property provides context of fine-scale features in terms of larger-scale features as well as information about the composition of larger features in terms of smaller features.

The procedure of the following example embodiment preferably utilizes both spectral (i.e., pertaining to color or intensity) and structural (i.e., pertaining to size, boundary smoothness) relationships between adjacent polygons to determine whether two polygons should be merged into a larger polygon. The degree of proximity, similarity, or significance of a given property between polygons needed to prompt their merger is deduced using statistical analysis of the property's distribution over all polygons at the current level that is subject to agglomeration to obtain the next, coarser level of segmentation. This use of ecological statistics to adaptively compute thresholds for degree of similarity of polygons with respect to a number of properties that determine their merger is a key strength of the proposed method. This eliminates the need to input parameters that optimally segment an image. Indeed, such parameters would need a priori knowledge of what works best for a particular image, which is generally unknown and image-dependant. Further, such parameters would differ from level to level even for a particular image in the proposed hierarchical segmentation. However, the extraction of parameters through polygon ecological statistics requires an abundance of samples to compute aggregates meaningfully. The current preferred procedure ensures this by automatically checking for and identifying a pivot level in the hierarchical segmentation process, wherein the median number of seed polygons constituting polygons at the pivot level exceeds the number of polygons at the pivot level. This signifies that there is a greater abundance of samples within each polygon on average than in the entire level. This pivot level separates two main stages of the preferred embodiment's procedure.

The first stage preferably uses interpolygon statistics at any level to compute thresholds and degrees of similarities of polygon properties that determine their merger. The identification of a pivot level as described above marks the end of the first stage and the beginning of the second stage. The second stage preferably computes, for each polygon, a distribution of values of each property over all polygons at the finest (seed) segmentation level. Two polygons are deemed similar with respect to a given property if their internal polygon distributions are less than a statistically computed aggregate deviation between two neighboring polygon distributions over all polygons in the level in question.

Stage 1 of the preferred embodiment is now described. Each polygon obtained from the fine-scale seed segmentation described above can be represented as a node in a polygon adjacency graph. The area distribution of polygons provides a picture of the granularities including the image at that scale of segmentation. The modes of the distribution are referred to as the regions between two successive minima of the distribution. In order to avoid detecting insignificant modes minima that are the least values of the distribution over a fixed radius about any value are sought. By choosing the largest mode (i.e., peak with the largest area under it) of this distribution the perceptually dominant granularity of the image are preferably identified. The image is then preferably flattened to this level of granularity by merging polygons whose areas are equal to or less than the dominant grain size with their most similar neighbors, where the measure of similarity can be structural as well as spectral; for example, grain size, shape, orientation and or color/intensity.

To compute the distribution of polygons with respect to area, a histogram of the polygon numbers over the range of their areas is preferably constructed. For the histogram to faithfully represent the distribution an appropriate bin size is estimated. In another example embodiment of the invention, this is done based on an algorithm proposed in the published work of H. Shimazaki and S. Shinomoto, (H. Shimazaki and S. Shinomoto, "A method for selecting the bin size of a time histogram," *Neural Computation*, vol. 19, pp. 1503-1527, 2007) however, other methods of optimal histogram binning may also be used. Shimazaki et al. propose an algorithm that minimizes the mean integrated squared error of the histogram of a finite sample from an unknown distribution with respect to the distribution. This is equivalent to finding the bin size Δ that minimizes the cost function:

$$\Theta(\Delta) = \frac{2\mu(\Delta) - v(\Delta)}{\Delta^2}$$

where μ and ν are the mean and variance of the histogram of the sample with bin size Δ.

This optimal binning can also be used to obtain distributions of the red, blue, and green (R, G, B) channel values of polygon colors. Modes of these color channel distributions are identified and each polygon is attributed the mode number it belongs to in each channel's distribution. Two polygons are deemed to have similar color if all their respective channel mode numbers are in agreement. Other polygon properties such as orientation, aspect ratio, etc., can be similarly analyzed for a more careful control of the polygon merging process.

In general, each polygon at a given level is adjacent to one or more polygons such that it therefore shares parts of its boundary with other polygons. Various structural properties are assigned to these polygon boundary interfaces to characterize how two polygons interact and decide whether an interface is likely to be an object boundary or not. Object polygons tend to have smoother boundaries than texture polygons which tend to be signfican tly more oscillatory in nature. This is because edges of objects are typically longer and smoother than texture elements which are typically smaller and tend to clump into polygons with wiggly meandering contours. This feature can be utilized as a perceptual cue to detect texture content in an image and prevent texture polygons from merging with object polygons at coarser scales. A simple measure of boundary wiggle for a polygon A is defined as:

$$W(A) = 1 - \frac{L_S(A)}{L(A)}$$

Where L(A) is the boundary length of the polygon and $L_S(A)$ is the length of its smoothed boundary. For two adjacent polygons A and B, noting that:

$$L(A \cup B) = L(A) + L(B) - 2L(A \cap B)$$

and $$L_S(A \cup B) \leq L_S(A) + L_S(B) - 2L_S(A \cap B)$$

$$W(A \cup B) \geq \frac{W(A)L(A) + W(B)L(B) - 2W(A \cap B)l(A \cap B)}{L(A) + L(B) - 2L(A \cap B)}$$

where $$W(A \cap B) = 1 - \frac{L_S(A \cap B)}{L(A \cap B)}$$

is the wiggle of the boundary interface of polygons A and B and L(A∩B), $L_S$(A∩B) are the length and smoothed length, respectively of the interface boundary. Although the equation above is an inequality, the difference between the two sides is typically small and due to the differences in smoothing at the points where the adjacency of the polygons begins and ends along their common interface. Therefore the right hand side of the equation is a good approximation of the wiggle of the union of two polygons and we use it to efficiently estimate the latter quantity without actually merging the two polygons-first. The wiggle and length of the interface can be computed at a lower cost from the polygon adjacency graph constructed at each level of the hierarchy. A boundary or boundary interface is described as salient if it is greater than a certain length and if its wiggle is less than a certain quantity. This notion helps identify boundary interfaces that are likely to be object boundaries.

In order to effectively use the notions of wiggle and saliency, it is preferable to compute adaptive thresholds as internal parameters that decide when a boundary is wiggly or salient. For each polygon lengths of the longest and shortest boundary interfaces are obtained and the wiggle values of the most and least wiggly interfaces are also obtained. From this the medians of the maximal interface lengths, the minimal interface lengths, the maximal interface wiggles, and the minimal interface wiggles are computed. The boundary interface of polygons A and B are defined as salient if L(A∩B) ≧median (maximal interface lengths) and if W(A∩B)≦median (minimal interface wiggles). Further a boundary is defined as a pseudoboundary if it is not salient and if either W(A∪B)≦min(W(A), W(B)), or W(A∪B)≧median (maximal interface wiggles).

The exemplary criteria of granularity, spectral similarity, saliency, and pseudoboundary have been defined to describe certain perceptual properties of polygons and their boundary interactions at any given level. Using these notions, an example set of actions in the first stage of one implementation of the present invention are as follows:

1. The seed segmentation of an input image is obtained.
2. The area distribution of all polygons at the current topmost level is obtained by optimally binning the areas (e.g., as done by Shimazaki and Shinomoto).
3. Modes of the area distribution are obtained.
4. The mode with the most number of polygons is identified and all polygons whose areas are less than the mean plus one standard deviation of this mode are marked as grain polygons.
5. Optimal distributions of the red, green, and blue (R,G,B) color channel values of all polygons is obtained as in step 2.
6. Modes of R, G, B distributions are obtained and each polygon is assigned its R, G, and B mode number.
7. The neighborhood structure of each polygon, consisting of all adjacent polygons, is obtained. From this the lengths and wiggles of the common boundaries of the polygon with its neighbors are computed.
8. The median values of the maximal and minimal lengths and wiggles over all polygon interface boundaries are computed.
9. Values computed in step 8 are used as thresholds for determining salient and pseudoboundary polygon interface boundaries (as described in previous paragraph)
10. Each polygon in the current level is evaluated for grouping with its neighbors as follows:
    a) If the polygon is a grain (see step 4) then it is eligible for merging with one or more of its neighbors.
    b) A grain polygon may merge with a neighbor if it:
       i) either shares the same R, G, and B mode numbers (see steps 5 & 6) with the neighbor
       or ii) its common boundary with the neighbor is a pseudoboundary (see step 9) and the neighbor is closest in color to the polygon among all its neighbors.
11. Among the set of set of neighboring polygons eligible for merging with the polygon in question, only those whose color distance is the least are allowed to merge with the polygon.
12. The resulting new polygons from mergers in step 11 are assigned the area-weighted average color of their constituent polygons.
13. The median number of seed polygons constituting each newly formed polygon is computed
14. Steps 2 through 13 are repeated until the number of polygons in the current level falls below the median number of seed polygons constituting them. That is to say, until the current level is the pivot level.

The detection of the pivot level marks the end of Stage 1 of this example implementation of the present invention.

Stage 2 of the example embodiment of the present invention is now described. The pivot level signifies that the number of samples within each polygon is on average greater than the number of polygon samples at the pivot level. At this stage, each polygon is preferably viewed as a restriction of the distribution of seed (finest level) polygons. Thus each polygon can be defined as a texture determined by the color and size distributions of its constituent seed polygons. Accordingly, two polygons are compared for similarity with respect to a property by computing a statistical distance between their seed polygon distributions representing the property.

In particular, the color of a polygon is no more represented by a vector of R, G, B color channel values, but by three distributions, one for each color channel. The value of each channel's distribution at a certain value of channel intensity is the area-weighted sum of all seed polygons with that value of channel intensity. For example, P and Q are two adjacent polygons with their R,G, B, distributions RhistP, GhistP, BhistP, and RhistQ, GhistQ, BhistQ, respectively. RhistI, GhistI, BhistI are defined to be the distributions corresponding to the 'polygon' corresponding to the entire image I. Then the distributions of P and Q are the restrictions of the image distributions to the seed polygons constituting P and Q, respectively. We define the dissimilarity of two polygons with respect to the color channels as:

$$D(P, Q) = \sum_i (RhistP = RhistQ)^2 / RhistI + \sum_i (GhistP = GhistQ)^2 / GhistI + \sum_i (BhistP - BhistQ)^2 / BhistI$$

where the summation is over all the channel intensity values considered (usually 0 through 255 for RGB color scheme). This distance differs from the chi-squared distance between distributions in that the denominator distribution in each summand is not the average of the two distributions in the numerator but, rather, a universal distribution from which all the polygon distributions are drawn. This measure preferably suppresses differences between polygons which are well represented numbers or areas in the image while it highlights differences between polygons that are sparsely represented. Thus it is well-adapted to merging texture areas while preserving distinctive features. In other embodiments of this invention one may use other distributional distances such as the Fischer distance or the Kullback-Liebler distance measuring mutual information between distributions.

Using the above notion of dissimilarity between two polygons for levels beyond the pivot level, the preferred embodiment can include two additional quantities, namely the external disparity DispE, and the internal disparity, DispI for any polygon P, which are defined as:

$$DispE(P) = \min_{Q \in Nbd(P)} (D(P, Q))$$

and $$DispI(P) = \underset{Q \subseteq P}{\text{median}}(DispE(Q))$$

The external disparity of a polygon preferably measures the minimum dissimilarity of a polygon with respect to its adjacent neighbors, while its internal disparity preferably measures the median external disparity of the polygons at the previous level constituting it. Preferably, internal disparity measures the heterogeneity of a polygon's constitution, while external disparity measures the minimum dissimilarity with respect to its immediate surroundings. These two quantities can preferably be used during the second stage to control the polygon merging process in a perceptually guided manner.

The steps in stage 2 of the example implementation of the preferred embodiment of the present invention are as follows:
1. Color channel distributions for each polygon at current level and for the entire image are obtained (as described in the previous paragraph)
2. Dissimilarities between all adjacent polygons at the current level are computed.
3. The internal and external disparities of all polygons at the current level are computed.
4. The pseudoboundary polygon interfaces are identified (as in stage 1).
5. Each polygon in the current level is evaluated for grouping with its neighbors as follows:
   A polygon may merge with one or more of its neighbors if all three following conditions are satisfied
   a) Its external disparity is less than or equal to the median of the external disparities of all polygons at the current level, or its internal disparity is greater than its external disparity.
   b) The dissimilarity of its qualifying merge neighbor is equal to the external disparity of the polygon (i.e., the neighbor is the least dissimilar)
   c) The boundary interface with a qualifying merge neighbor is a pseudoboundary, or the merge neighbor's color distance from the polygon is less than the median of the minimal color distances of all polygons from their neighbors
6. Of all candidate merge neighbors of a polygon identified in step 5, only those that are closest in color to the polygon are allowed to merge with the polygon
7. Steps 1 through 6 are repeated to produce new levels in the hierarchical segmentation until no new polygonal mergers are possible.

The end of stage 2 completes the hierarchical segmentation process.

Figure 2:
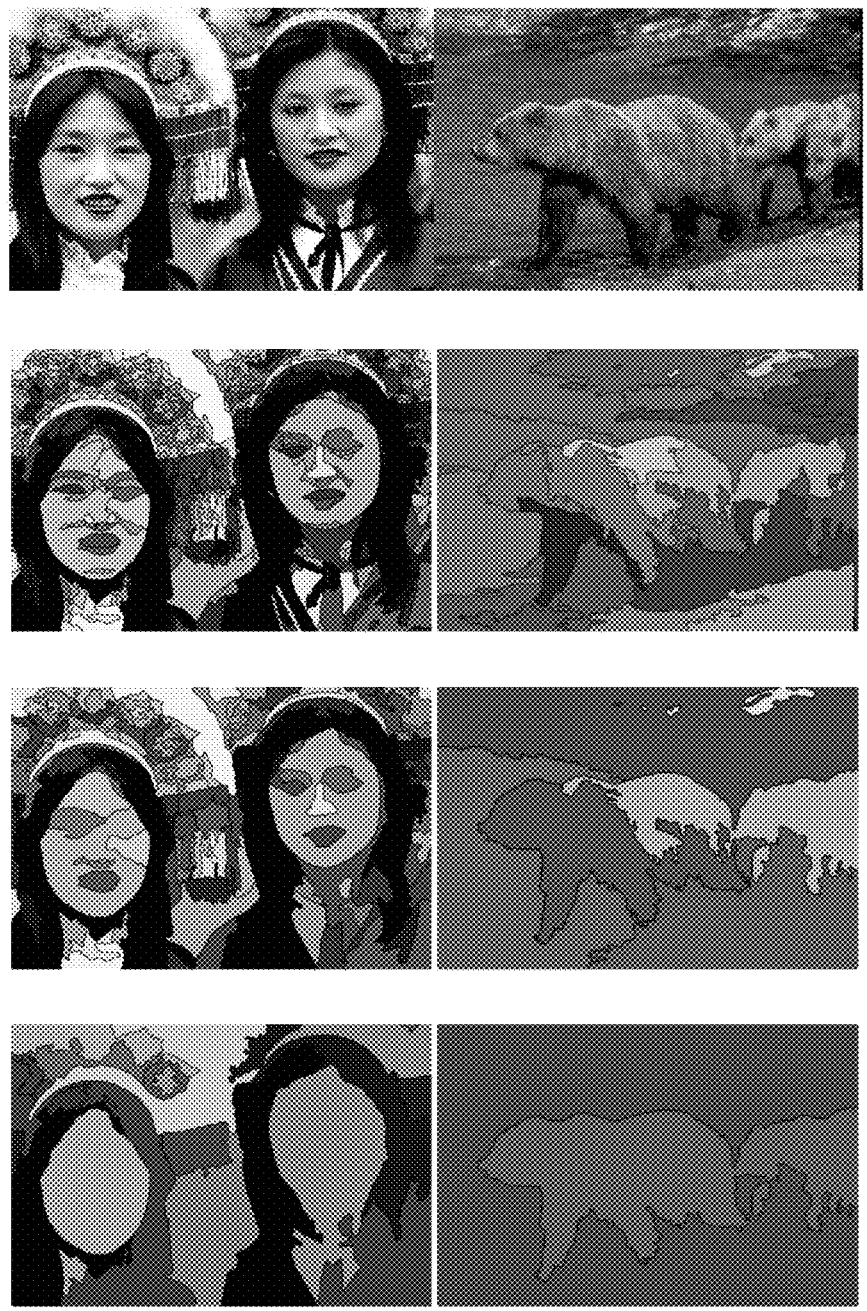
FIG. 2 shows examples of hierarchical segmentations obtained by the disclosed method on a high contrast low texture image and a low contrast high texture image.

Aspects of the example implementation of the preferred embodiment are shown in FIGS. 2 through 6. FIG. 2 illustrates the example implementations of the preferred methodolgy with layers 2 to 4 from the hierarchical segmentations of two images in the Berkeley image segmentation data set. The top row depicts the input pixel images. The disclosed method of hierarchical segmentation clearly preserves boundaryfidelity at all lev els as illustrated in FIG. 2. That is to say, all boundaries at any level are a subset of the original boundaries and no new ones are created. This is due to the inheritance of Canny edges by polygons from those constituting them at the previous level.

Figure 3:
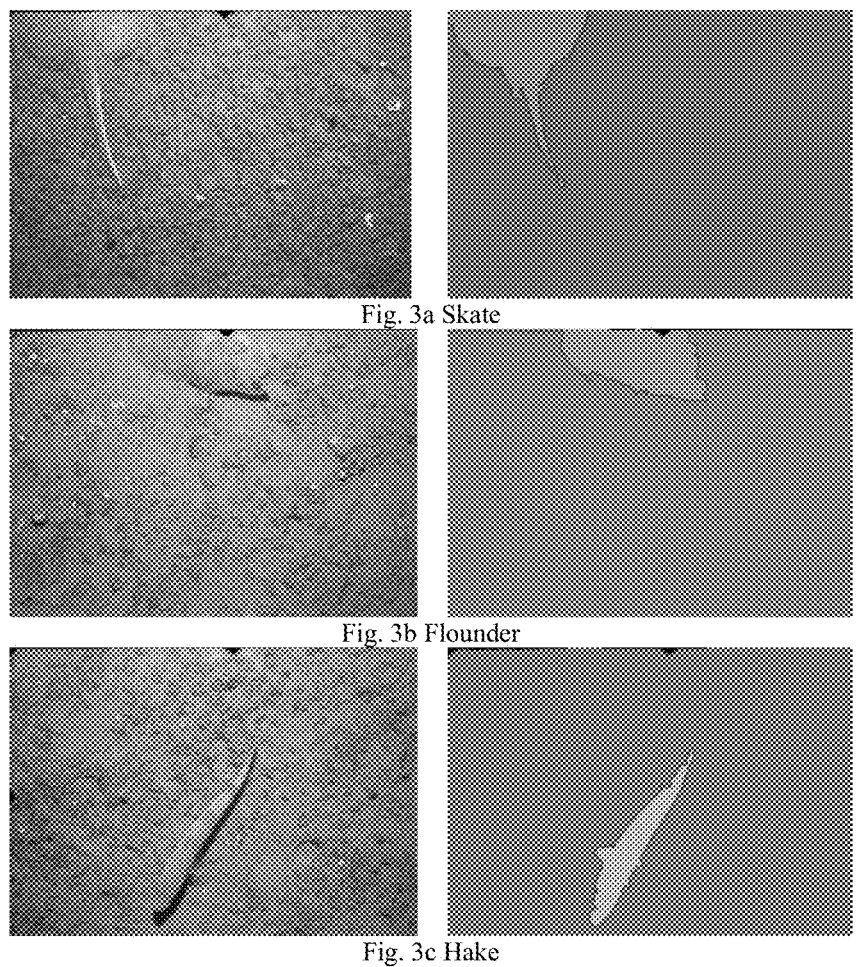
FIG. 3 shows examples of segmentations by the disclosed method of camouflaged fish using wiggle filtering at coarse scales.

FIG. 3 illustrates the use of wiggle to suppress texture and extract camouglaged fish in ocean floor imagery. Thus the hierarchical segmentation scheme disclosed herein not only preserves contour integrity across coarsening scales but also provides an easy way to detect and isolate texture from salient objects even in very challenging imagery.

Figures 4, 5:
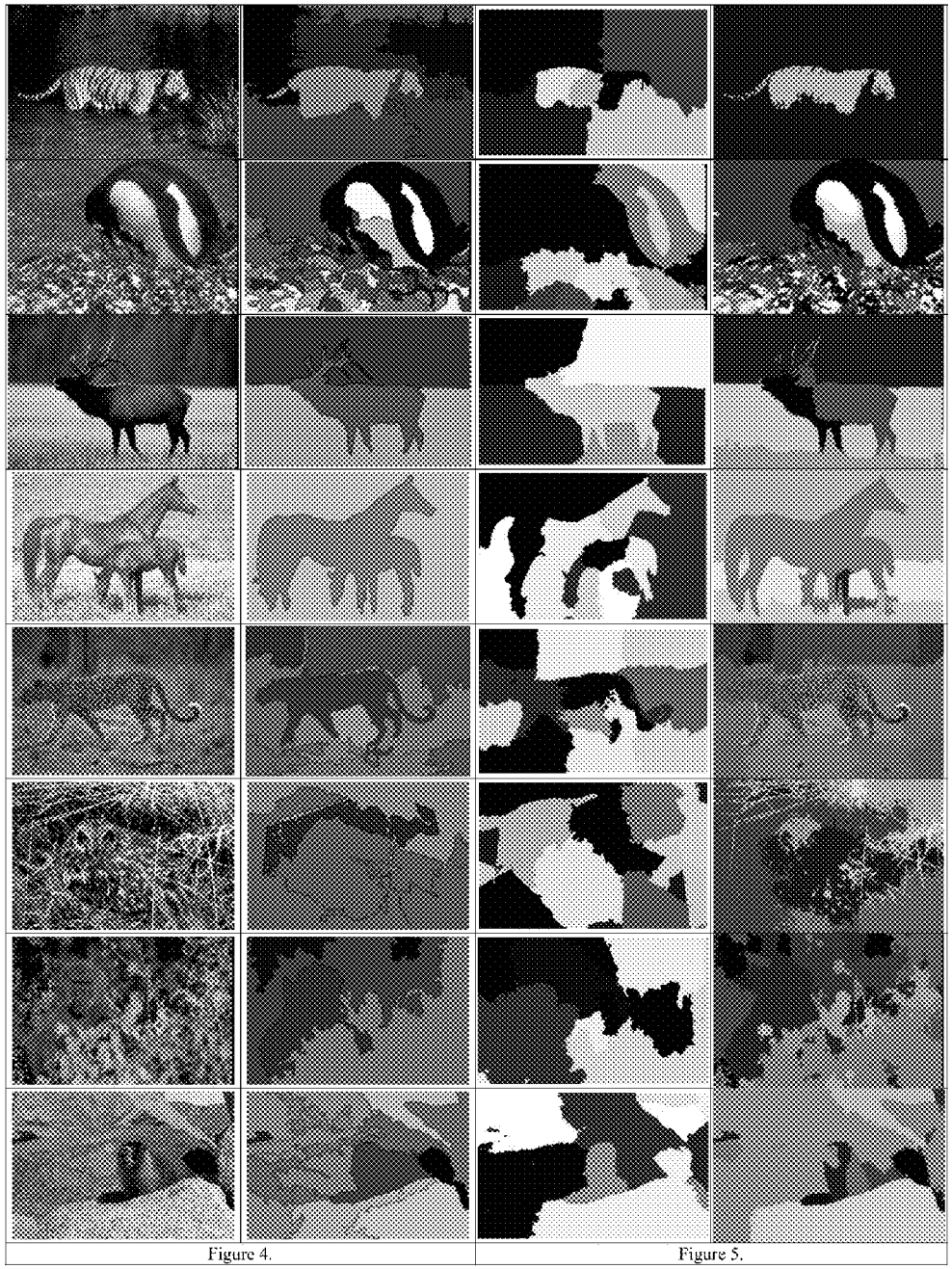
FIG. 4 shows example images from the Berkeley data set on the left, and a select level from the hierarchical segmentations by disclosed method on the right.
FIG. 5 shows the results of multiscale normalized cuts on the left and mean shift methods on the right applied to the same images as shown in FIG. 4.
Figure 6:
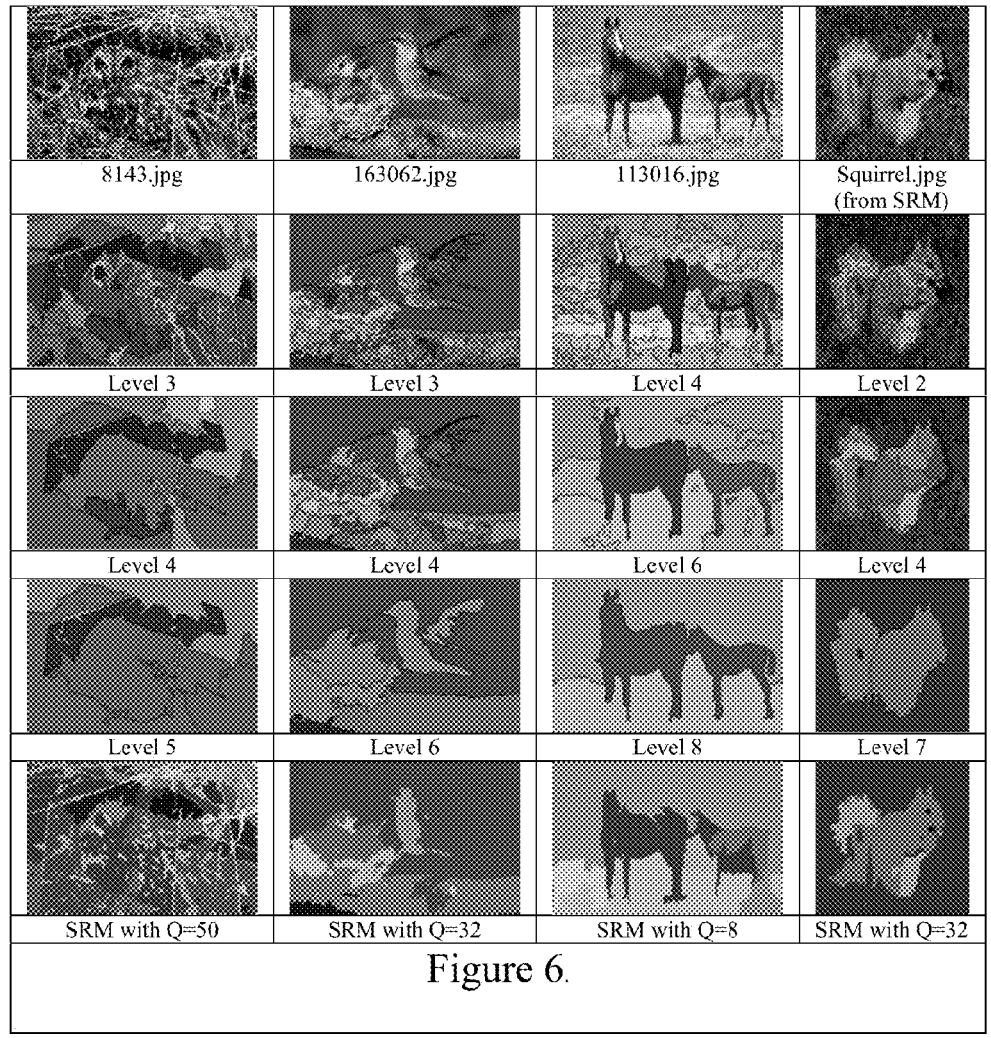
FIG. 6 shows a comparison of the hierarchical method of the present invention and that of Statistical Region Merging.

FIG. 4 shows a coarse-scale level polygonal decomposition as obtained by the disclosed hierarchical method (second column from left), depicting extracted important features for each of the input pixel images shown on the leftmost column. The choice of the example input images was motivated by feature complexity, variability in contrast, texture, and color.

FIG. 5 illustrates the performance of two other well-known methods, namely the multiscale normalized cuts method (third column from left) and the mean shift method (fourth column from left) on the same set of input images shown in FIG. 4.

Apart from the qualitative superiority of the results of the exemplary method shown in FIG. 4 over those of the other two methods shown in FIG. 5, there are operational differences between the example method and the compared methods. In both cases of the compared methods the required input parameters were selected through trial and error on a per image basis to obtain visually best segmentations for each image such that the salient features of interest were depicted with the least number of polygons. In the case of the multiscale normalized cuts method, the number of regions that obtained best results for each image were selected, whereas, in the case of the mean shift method the spatial and spectral bandwidth parameters that obtained the best results, again on a per image basis, were selected. In contrast, there are no input parameters for the preferred method. The canny edge detection parameters that govern the initial segmentation in this example embodiment of the invention that used VISTA for obtaining a seed segmentation were fixe d at sigma=1 and the high and low hysteresis thresholds were fixed at 0.6 and 0.0, respectively, for all images. Both the multiscale Ncuts and the mean shift methods yield over-segmentations of salient objects of interest compared to the preferred method. This necessitates further processing to assemble the parts into a meaningful whole for object recognition. Although the mean shift method produced visually better looking segmentations, the number of regions produced by it is significantly larger than the other two methods. For instance, in the case of the leopard image, each spot is a different segment in the mean shift result, and the leopard does not correspond to a single polygonal segment as in the preferred method. The disclosed method also produces a hierarchy of segmentation images at multiple scales with features of different saliencies extracted at different levels whereas the other two methods produce a single segmentation image for a given input image and parameter set. Thus, to obtain finer or coarser scale features, the comparison methods would require re-segmentation of the image. By way of comparison, the segments obtained at different scales by the example method of the present invention form a tree with finer scale segments nested in segments at a coarser level, providing contextual information. The segments obtained by the multiscale normalized cuts and the mean shift methods do not have this hierarchical containment property across scales. Thus the same object may be segmented in two different ways for differing parameters with the segments intersecting across the results.

The example method explicitly provides the contours of the segments, while the other two methods provide pixel masks for the segments requiring further processing to obtain contours. Finally, as illustrated in Table 2, the disclosed hierarchical method is an order of magnitude faster than the other two methods. This is even allowing for a ten-fold speedup in a C implementation of the multiscale normalized cuts method over the MatLab implementation results described herein.

TABLE 2

| Image | Disclosed Method | | Multiscale Ncuts | | Mean Shift | |
|---|---|---|---|---|---|---|
| | T | N | T | N | T | N |
| Elk | 0.30 | 3 | 41.9 | 5 | 15.4 | 65 |
| Tiger | 0.52 | 8 | 57.5 | 7 | 25.7 | 105 |
| Horse | 0.55 | 2 | 105.6 | 13 | 15.4 | 121 |
| Marmot | 0.56 | 16 | 91.2 | 12 | 19.9 | 207 |
| Baboon | 0.34 | 5 | 69.2 | 7 | 15.9 | 371 |
| Penguin | 0.33 | 72 | 182.6 | 17 | 18.0 | 791 |
| Owl | 0.51 | 5 | 121.4 | 10 | 43.8 | 1255 |
| Leopard | 0.40 | 11 | 156.0 | 17 | 47.6 | 1952 |

Comparison of run times (T) in seconds and the number of segmented regions (N) obtained by our method, the multiscale normalized cuts method, and the mean shift method for the eight images in FIGS. 4 and 5. All timings were taken on a 2.13 GHz Intel Pentium M processor with 2 GB of RAM.

As discussed, the preferred method in its example implementations provides a highly efficient linear time algorithm for hierarchical image segmentation based on that it: reveals objects and features at various saliencies; preserves boundary integrity across scales; provides contextual information in a segmentation tree of nested object with parent-child relationships; provides boundary information without additional effort because of vector (polygonal) segments; and allows the detection of texture in images and handle them differently from object segments.

Additional structural, spectral, and statistical criteria may be easily incorporated to significantly enhance or specialize the segmentation performance. No parameters need to be varied to segment different images. The number of segments at each level and the total number of levels is completely data adaptive. Applications such as automated content-based classification, archival, and retrieval of images, video analysis, etc., require not only efficient but also robust image segmentation methods that do not assume a priori knowledge of image characteristics or parameters to segment and analyze them. Further, to accommodate a wide range of queries on image content, segmentations must preemptively provide features at multiple scales and in a manner in which they can be related to extract image semantics via object/feature context.

Anomaly Detection

Figure 7:
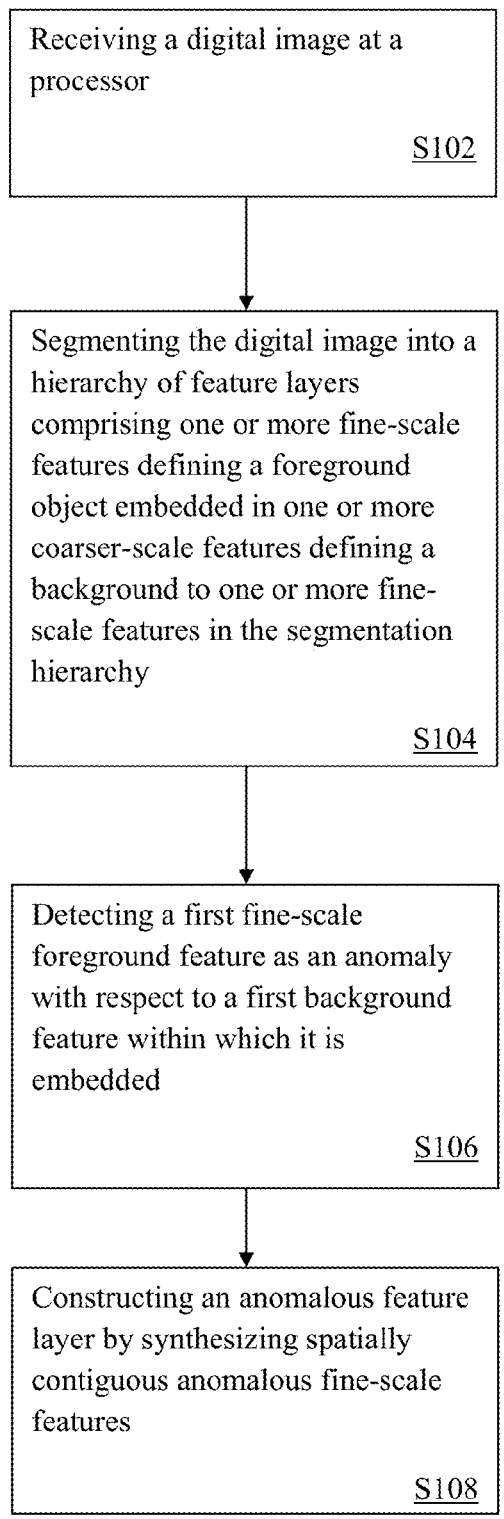
FIG. 7 is a flowchart depicting a method for detecting anomalies in an image in accordance with a preferred embodiment of the present invention.

As shown in FIG. 7, a preferred method for detecting anomalies in one or more images can include receiving a digital image at a processor in block S102; segmenting the digital image into a hierarchy of feature layers comprising one or more fine-scale features defining a foreground object embedded in one or more coarser-scale features defining a background to the one or more fine-scale features in the segmentation hierarchy in block S104; detecting a first fine-scale foreground feature as an anomaly with respect to a first background feature within which it is embedded in block S106; and constructing an anomalous feature layer by synthesizing spatially contiguous anomalous fine-scale features in block S108. The preferred method functions to automatically target, detect, compute, determine, and/or identify anomalies in a digital image. Suitable images can include any type of digital image such as satellite/aerial images, medical images, or any other type of image. Additionally, a suitable digital image can include a difference image, which can include a comparison between two substantially similar or co-registered images of substantially the same features/area at different times. As an example, a difference image can include a digital comparison between two satellite images taken during different seasons or under different weather/climate conditions.

As shown in FIG. 7, the preferred method can include block S102, which recites receiving a digital image at a processor. Block S102 preferably functions to capture, collect, retrieve, assemble, generate, and/or receive a digital image at a suitable processor. As noted above, a digital image can include any one or more images or composites of images being storable and/or displayable in a digital format and/or having one or more discrete data and/or visual elements such as pixels. A suitable processor can include any general or special purpose programmable computing device, such as for example one or more processors associated with a standalone computing device, a laptop computer, a desktop computer, a tablet computer, a smart phone, a personal digital assistant, a digital camera, a mainframe computer, a distributed network of computers (i.e., a cloud based computing platform), and/or any suitable combination thereof. In one variation of the preferred method, block S102 can be performed on a single or networked device, and the digital image can be received at the processor from an image capture device such as a camera. Alternatively, the digital image can be received at the processor from a local or remote memory/storage module configured to store and/or process or preprocess the digital image.

As shown in FIG. 7, the preferred method can further include block S104, which recites segmenting the digital image into a hierarchy of feature layers comprising one or more fine-scale features defining a foreground object embedded in one or more coarser-scale features defining a background to the one or more fine-scale features in the segmentation hierarchy. Block S104 preferably functions to segment, divide, partition, categorize, parse, and/or digest the digital image into two or more portions (foreground, background) such that features can be analyzed in the context of various background levels. As an example, whether or not a red car is an anomalous feature within a digital image depends at least in part upon the context within which the red car is located. Certainly, a red car located in a digital image of a parking lot would appear less anomalous than a red car located in a digital image of a mountainside or beach. Preferably, block S104 can include segmenting the digital image into a series of polygons of the type described above with reference to FIGS. 2-6. Alternatively, any other suitable process, means, or mechanism for segmenting the digital image into foreground and background portions within a segmentation hierarchy can be included in block S104.

As shown in FIG. 7, the preferred method can further include block S106, which recites detecting a first fine-scale foreground feature as an anomaly with respect to a first background feature in which it is embedded. Block S106 preferably functions to determine, calculate, compute, and/or detect an anomalous feature within a predetermined background of that feature. Preferably, the anomalousness of a fine-scale feature is determined with respect to its immediate coarser-level background, i.e. within a limited context. Alternatively, the anomalousness of the fine-scale feature can be determined with respect to any size, shape, or level of background within the segmented hierarchy. In one variation of the preferred method, detecting an anomaly in the background feature can include detecting a statistically deviant spectral value in the distribution of spectral values of the descendant polygons of the background feature. Preferably, a statistically deviant spectral value can include a spectral value that lies at a statistical distance greater than a specified value from the mean value of the spectral distribution. In another variation, the preferred method can further include characterizing all descendant polygons, corresponding to the statistically deviant spectral value identified in the distribution of the spectral values of descendant polygons of the background feature, as anomalous with respect to the background feature. In another variation of the preferred method, detecting an anomalous descendant feature in a background feature can include detecting a statistically deviant spectral value in the distribution of the spectral values of the descendants at a finer scale layer of the background feature. Preferably, the outlier in the spectral distribution can include a spectral value that lies at a statistical distance greater than a specified value from the mean value of the spectral distribution. Preferably, spectral values at one or more levels of the image segmentation hierarchy are statistically modeled as Gaussian, ellipsoidal or other well-parameterized functions. Accordingly, a statistically deviant spectral value can include a spectral value that is more than a predetermined Mahalanobis distance from the mean in a Gaussian or ellipsoidal distribution of spectral values.

As shown in FIG. 7, the preferred method can further include block S108, which recites constructing an anomalous feature layer by synthesizing anomalous fine scale features. Block S108 preferably functions to group, consolidate, merge, and/or maintain anomalous features as the background features are increased in size and/or merged into the full image. That is, the anomalousness of each fine-scale feature can be preserved in the entire image through the grouping or merger of anomalous features to generate a consolidated anomalous feature. In one variation of the preferred method, constructing the anomaly layer from the detected anomalies can include agglomerating anomalous polygons using a segmentation method. Preferably, agglomerating anomalous polygons to form the anomaly layer can further include preserving an anomaly detected in one of the background polygons. The anomalousness of any feature is preferably maintained throughout the hierarchy and through the synthesis and/or de-segmentation of the digital image such that anomalous features can be readily viewed with respect to entirety of the digital image.

Figure 8:
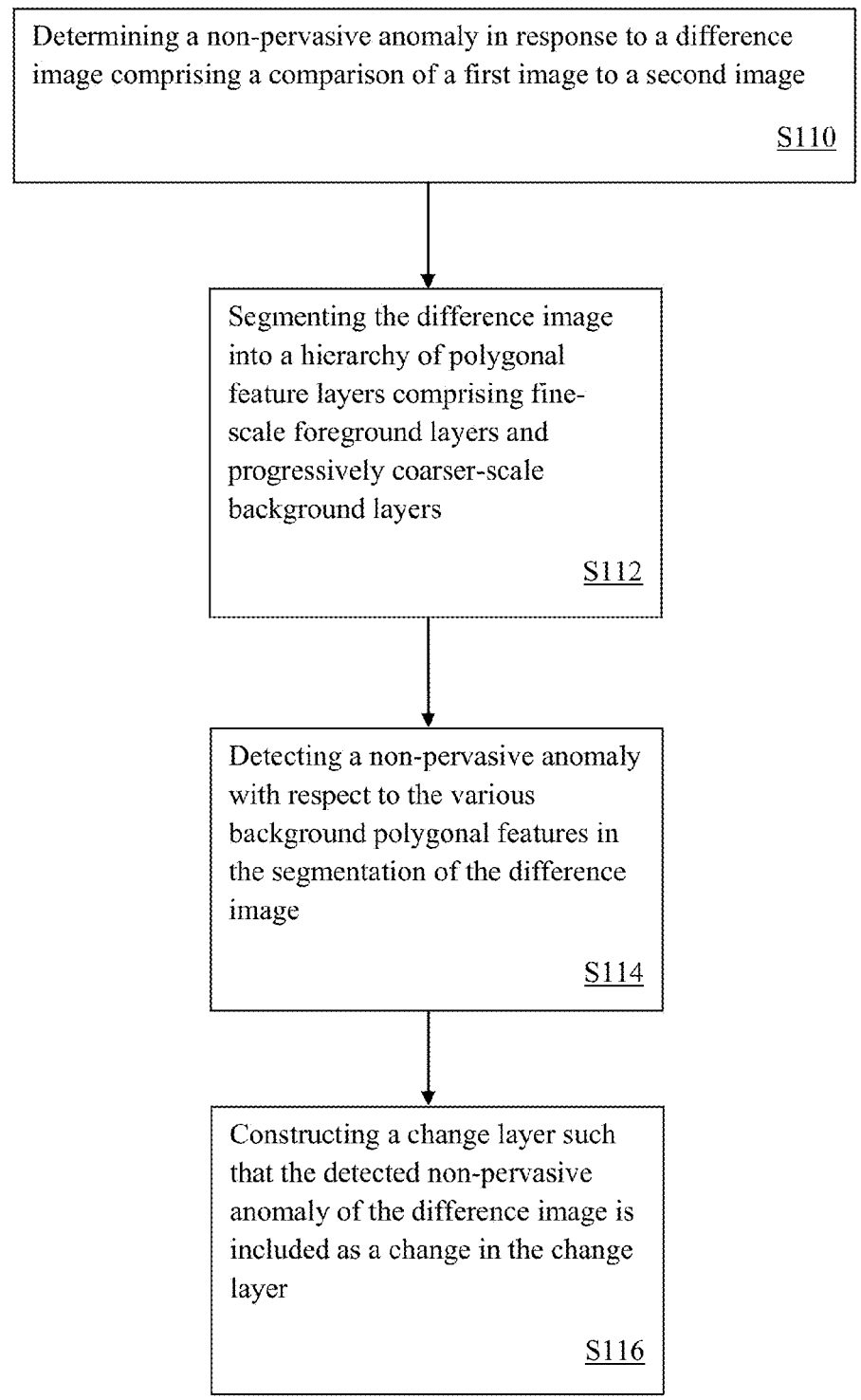
FIG. 8 is a flowchart depicting a variation of the preferred method for detecting anomalies in accordance with the present invention.

As shown in FIG. 8, another variation of the preferred method can further include block S110, which recites determining a non-pervasive anomaly in response to a difference image including a comparison of a first image to a second image. Block S110 preferably functions to assist in determining, computing, calculating, locating, and/or detecting an anomaly that is present between two images, such as for example two images of substantially the same features having some other variable (e.g., time, lighting, imaged spectrum, filtering, processing, and the like) there between. As an example, a difference image can include a comparison of an aerial or satellite image of a farm in the spring and the autumn in order to determine the changes in the fields, irrigation, or other characteristics of the landscape. In another example, the difference image can include a comparison of an aerial or satellite images of a glacier taken at different times or with different lighting in order to determine changes in ice progress/regress, ice thickness, habitable area, and the like.

As shown in FIG. 8, another variation of the preferred method can include block S112, which recites segmenting the difference image into a hierarchy of polygonal feature layers including fine-scale foreground layers and progressively coarser-scale background layers. Block S112 preferably functions to segment, divide, partition, categorize, parse, and/or digest the difference image into two or more portions (foreground, background) such that features can be analyzed in the context of various background levels. As an example, whether or not a road is an anomalous feature within a difference image depends at least in part upon the context within which the road is located. A road located in a developed city or town would appear less anomalous than a road leading into an uninhabited desert. Preferably, block S112 can include segmenting the difference image into a series of polygons of the type described above with reference to FIGS. 2-6. Alternatively, any other suitable process, means, or mechanism for segmenting the difference image into foreground and background portions within a segmentation hierarchy can be included in block S112.

As shown in FIG. 8, another variation of the preferred method can additionally include block S114, which recites detecting a non-pervasive anomaly with respect to the background layers in the segmentation of the difference image. Block S114 preferably functions to determine, calculate, compute, and/or detect an anomalous feature within a predetermined background of that feature. Preferably, the non-pervasive anomalousness of a fine-scale feature is determined with respect to its immediate coarser-level background, i.e. within a limited context. Alternatively, the non-pervasive anomalousness of the fine-scale feature can be determined with respect to any size, shape, or level of background within the segmented hierarchy. In another variation of the preferred embodiment, detecting a non-pervasive anomaly with respect to the various background polygonal features in the segmentation of the difference image can include detecting a statistically deviant spectral value in the distribution of spectral values of descendants at a finer-scale layer of a background polygon in a hierarchical segmentation of the difference image. Alternatively, block S114 can also include identifying a fine-scale polygon corresponding to the outlier spectral value in the spectral distribution of the background polygons in the hierarchical segmentation of the difference image.

In yet another alternative embodiment of the preferred method, block S114 can include finding an element of the distribution that is at a statistical distance greater than a prescribed value from the mean value of the spectral distribution. As noted above, each degree of the hierarchical segmentation (i.e., each polygon in the hierarchy) can have a statistical model of its spectrum such as for example a Gaussian or elliptical functional representation of the spectral distribution. Accordingly, block S114 can employ any suitable statistical mechanism for determining the relative anomalousness of any particular segment or portion of a segment relative to the statistical distribution of that portion of the hierarchy. In another alternative embodiment, the preferred method can additionally include constructing a statistical distribution of the background polygon using a joint average spectral value of a region of each of the first image and the second image corresponding to a predetermined descendant polygon.

As shown in FIG. 8, another variation of the preferred method can further include block S116, which recites constructing a change layer such that the detected non-pervasive anomaly of the difference image is included as a change in the change layer. Block S116 preferably functions to group, consolidate, merge, and/or maintain the non-pervasive anomalous features as the background features are increased in size and/or merged into the full difference image. As noted above with reference to FIG. 7, the non-pervasive anomalousness of each fine-scale feature can be preserved in the entire image through the grouping or merger of anomalous features to generate a consolidated non-pervasive anomalous feature in the change layer. In one variation of the preferred method noted above, constructing the non-pervasive anomaly layer from the detected anomalies can include agglomerating anomalous polygons using a segmentation method. Preferably, agglomerating anomalous polygons to form the change layer can further include preserving an anomaly detected in one of the background polygons. As before, the anomalousness of any feature is preferably maintained throughout the hierarchy and through the synthesis and/or de-segmentation of the difference image such that anomalous features can be readily viewed with respect to entirety of the difference image.

Example Method

Figure 9:
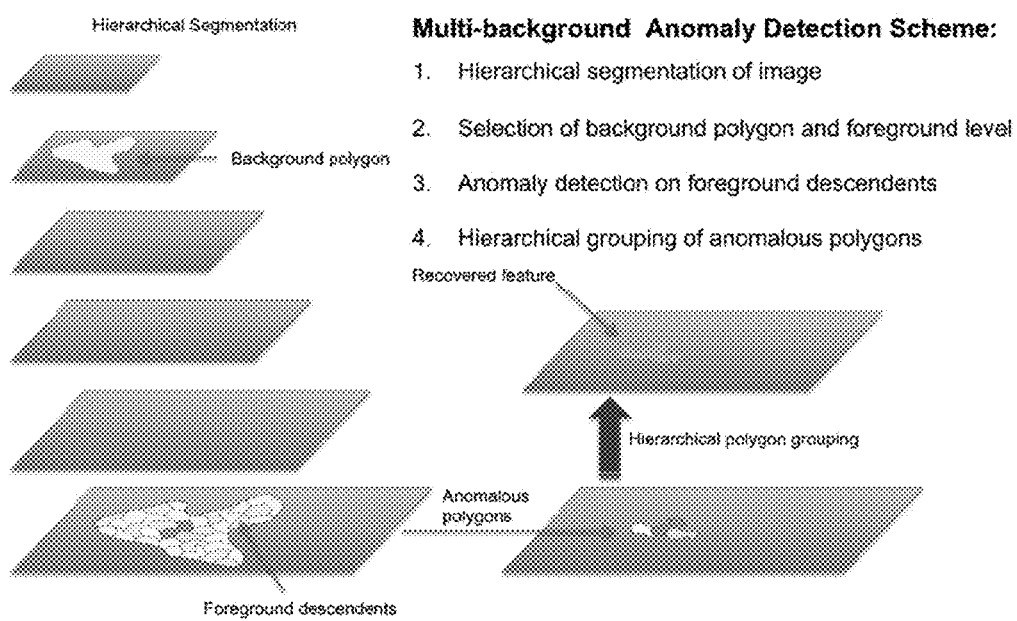
FIG. 9 is a schematic diagram of one or more aspects of the preferred method for detecting anomalies in accordance with the present invention.

The beneficial aspects and/or features of the preferred method can be implemented in any number of suitable methods, processes, and/or computer program products, one example of which is described with reference to FIGS. 9 and 10. The example method preferably includes substantially restricting its statistical analysis to image regions that are spectrally more uniform than the whole image, which in turn improves detection of subtle anomalies that would not distinguish themselves in the larger context of the whole image.

In the preferred hierarchical segmentation scheme, described in detail above, the process of agglomeration of polygons at a certain level of the hierarchy to get the next, coarser level of segmentation is governed essentially by three broad perceptual criteria: 1) Similarity of spectral distributions of candidate merge regions, 2) size of candidate regions (i.e., small regions are encouraged to merge with their most suitable neighbors), and 3) smoothness of region boundary interfaces (i.e., regions with smooth boundaries separating them are not merged). These criteria preferably act in conjunction to decide which regions get merged. Criterion 1 preferably fosters spectrally homogeneous regions, while criterion 2 preferably fosters the extraction of larger regions. These two competing criteria result in the embedding of a few small, spectrally distinct regional features into otherwise homogeneous regions, which has the effect of providing image-adaptive, spectrally uniform backgrounds whose boundaries conform to image edges. The statistics of these backgrounds are better amenable to approximations by parameterized distributions such as Gaussian or ellipsoidal functions whose outliers are easier to detect by measures such as the Mahalanobis distance as noted above. This simplification of image spectral distribution by restricting to relatively homogeneous sub backgrounds from coarser levels of the segmentation hierarchy in essence provides multiple query context in each of which it is easier to detect anomalies than in the whole image taken all at once.

Figure 10A:
Figure 10B:
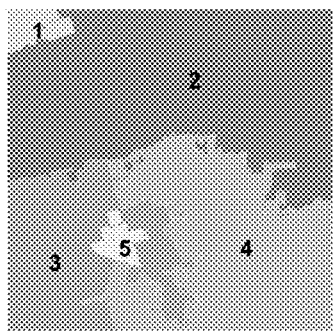
Figure 10C:
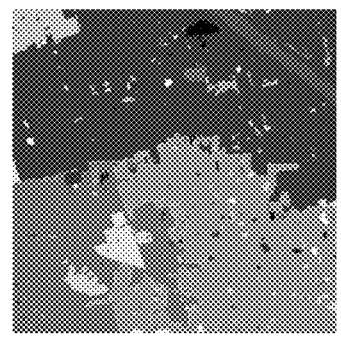
Figure 11A:
FIGS. 11A, 11B, 11C, 11D, 11E, and 11F are exemplary images derived by the example implementation of the preferred method for detecting anomalies in accordance with the present invention.
Figure 11B:
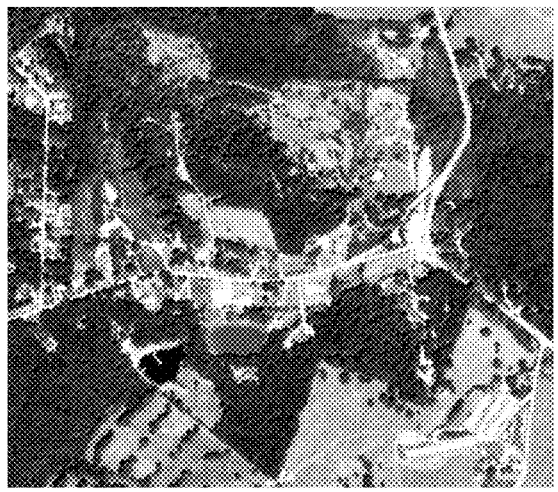
Figure 11C:
Figure 11D:
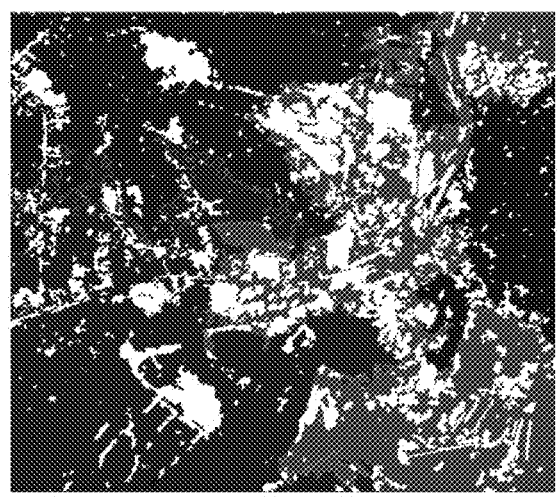
Figure 11E:
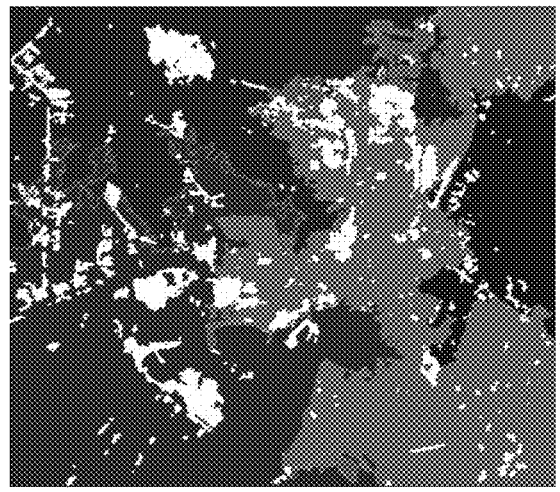
Figure 11F:
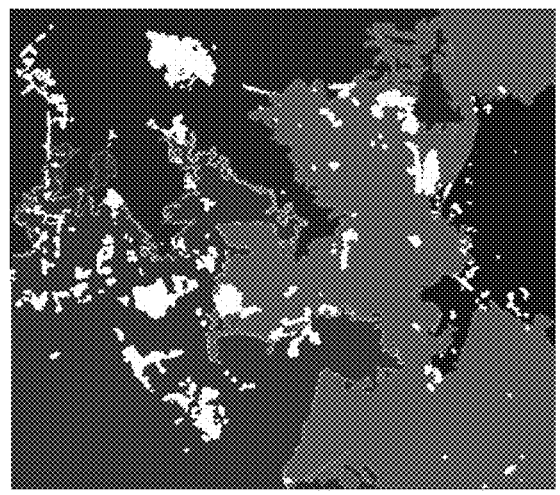

The hierarchy provides multiple opportunities to query an image for anomalies under different spatial contexts. Coarser levels of the hierarchy afford enough sample points to form a distribution and hence are preferred choices for backgrounds. The example method preferably takes advantage of the finest scale polygons as superpixels that not only contain structural information in terms of their boundaries conforming to image edges, but also regularize the spectral variability to avoid detection of nonstructural noisy pixels as anomalies. When anomalous polygons are detected with respect to a higher-level parent background, they can be easily grouped in the segmentation scheme to obtain shape information for characterizing the anomalies. FIG. 9 illustrates the example methodology schematically, while FIG. 10A, 10B, and 10C show an example of contextual anomaly detection with respect to five coarse-level polygonal segments on an image. FIG. 10D shows the distributions of spectral values of fine-scale polygons contained within the preceding figures. The detected polygons are shown with random grayscale in FIG. 10C after adjacent polygons are merged.

One variation of the example method can include performing a pixel-to-pixel comparison of a co-registered image pair in which the pixels corresponding to the same scene locations have the same image location. Change detection can then be characterized as modeling the ambient variation between corresponding pixels across the image and looking for pixel pairs that differ from each other in a way that is unusual compared to how most other corresponding pixels differ. One preferred model to capture the changes is to first take the pixel-wise spectral difference of the two images and consider the difference distribution. Outliers of this distribution correspond to anomalies in the difference image and are indicative of anomalous changes, as against pervasive changes, between the images. Suitable transformations can be performed on the images, such as covariance equalization, that could mitigate the pervasive differences. However, images can have different variabilities in different regions of the images based on the terrain and features present. For example, some areas are more susceptible to shadows, retention of snow, or foliage changes than others. Therefore, as in the case of anomaly detection, there are no guarantees that the difference distribution is Gaussian. As in the case of anomaly detection, the simplification of the difference distribution by restricting to relatively homogeneous sub backgrounds from coarser levels of the segmentation hierarchy in essence provides multiple query context in each of which it is easier to detect changes than in the whole image taken all at once.

For example, FIG. 11 shows two corresponding image regions (11A, 11B) from a co-registered image pair and their absolute difference image (11C). Coarser level segments from the hierarchical segmentation of the difference image (shown as gray patches (11D, 11E, 11F) are used as backgrounds to detect outliers at a Mahalanobis distance greater than two, three, and four from the mean of the spectral distribution of all finest level polygons contained in them (11D, 11E, 11F). As noted above, the example method can use, incorporate, employ, and/or implement any suitable statistical, machine learning, or other algorithm for determining the anomalousness of any given data set. As shown in the Figures, some of the changes detected are clearings in vegetative growth, and urban development between (11A) and (11B). Pervasive changes such as change in illumination and seasonal changes (fall in (11A) versus summer in (11B)) are preferably ignored.

An alternative embodiment preferably implements the one or more aspects of the preferred apparatus and/or method in a computer-readable medium storing computer-readable instructions. The instructions are preferably executed by computer-executable components. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively, or additionally, be executed by any suitable dedicated hardware device. The computer-executable component is preferably designed for any suitable computing platform.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
receiving a digital image at a processor;
segmenting the digital image into a hierarchy of feature layers comprising one or more fine-scale features defining a foreground object embedded in one or more coarser-scale features defining a background to the one or more fine-scale features in the segmentation hierarchy;
detecting a first fine-scale foreground feature as an anomaly with respect to a first background feature within which it is embedded; and
constructing an anomalous feature layer by synthesizing spatially contiguous anomalous fine-scale features.

2. The method of claim 1, wherein segmenting the image comprises hierarchically segmenting the image into multiple feature layers, each comprising two or more polygons.

3. The method of claim 1, further comprising: identifying for each fine-scale feature one or more background features as ancestors in the segmentation hierarchy, and identifying for each coarser-scale feature one or more foreground features as descendants in the segmentation hierarchy.

4. The method of claim 3, further comprising constructing a statistical distribution of finer-scale descendant polygons for each coarser-scale background polygon in response to the spectral attributes of the descendant polygons.

5. The method of claim 1, wherein detecting an anomaly in the background feature comprises detecting a statistically deviant spectral value in the distribution of spectral values of the descendant polygons of the background feature.

6. The method of claim 5, further comprising characterizing all descendant polygons, corresponding to the statistically deviant spectral value identified in the distribution of the spectral values of descendant polygons of the background feature, as anomalous with respect to the background feature.

7. The method of claim 6, wherein detecting an anomalous descendant feature in a background feature comprises detecting a statistically deviant spectral value in the distribution of the spectral values of the descendants at a finer scale layer of the background feature.

8. The method of claim 7, wherein the outlier in the spectral distribution comprises a spectral value that lies at a statistical distance greater than a specified value from the mean value of the spectral distribution.

9. The method of claim 1, wherein constructing the anomaly layer from the detected anomalies comprises agglomerating anomalous polygons using a segmentation method.

10. The method of claim 9, wherein agglomerating anomalous polygons to form the anomaly layer further comprises preserving an anomaly detected in one of the background polygons.

11. The method of claim 1, further comprising determining a non-pervasive anomaly in response to a comparison of a first image to a second image.

12. The method of claim 11, wherein the comparison of the first image to the second image comprises a difference image of the first image and the second image.

13. The method of claim 12, further comprising for the difference image:
segmenting the difference image into a hierarchy of polygonal feature layers comprising fine-scale foreground layers and progressively coarser-scale background layers;
detecting a non-pervasive anomaly with respect to the background layers in the segmentation of the difference image; and
constructing a change layer such that the detected non-pervasive anomaly of the difference image is included as a change in the change layer.

14. The method of claim 13, wherein detecting a non-pervasive anomaly with respect to the various background polygonal features in the segmentation of the difference image comprises detecting a statistically deviant spectral value in the distribution of spectral values of descendants at a finer-scale layer of a background polygon in a hierarchical segmentation of the difference image.

15. The method of claim 14, wherein detecting a statistically deviant spectral value comprises identifying a fine-scale polygon corresponding to the outlier spectral value in the spectral distribution of the background polygon in the hierarchical segmentation of the difference image.

16. The method of claim 14, wherein detecting an outlier in the spectral distribution of the background polygon in the hierarchical segmentation of the difference image comprises finding an element of the distribution that is at a statistical distance greater than a prescribed value from the mean value of the spectral distribution.

17. The method of claim 15, further comprising constructing a statistical distribution of the background polygon using a joint average spectral value of a region of each of the first image and the second image corresponding to a predetermined descendant polygon.

* * * * *